US012158156B2

(12) United States Patent
Chen

(10) Patent No.: US 12,158,156 B2
(45) Date of Patent: Dec. 3, 2024

(54) CEILING FAN INFRARED DETECTION AND CONTROL SYSTEM

(71) Applicant: AIR COOL INDUSTRIAL CO., LTD., Taichung (TW)

(72) Inventor: Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 71 days.

(21) Appl. No.: 18/065,386

(22) Filed: Dec. 13, 2022

(65) Prior Publication Data

US 2024/0191720 A1 Jun. 13, 2024

(51) Int. Cl.
*F04D 27/00* (2006.01)
*F04D 25/08* (2006.01)
*F04D 27/02* (2006.01)

(52) U.S. Cl.
CPC ......... *F04D 27/004* (2013.01); *F04D 25/088* (2013.01); *F04D 27/0261* (2013.01); *F05D 2270/303* (2013.01); *F05D 2270/804* (2013.01)

(58) Field of Classification Search
CPC .. F04D 27/004; F04D 25/088; F04D 27/0261; F05D 2270/303; F05D 2270/804
USPC ........................................................ 340/545.3
See application file for complete search history.

(56) References Cited

U.S. PATENT DOCUMENTS

| | | | | |
|---|---|---|---|---|
| 11,506,215 | B1 * | 11/2022 | Desmet | F04D 19/002 |
| 2018/0343139 | A1 * | 11/2018 | Saxena | G05B 19/0426 |
| 2019/0086528 | A1 * | 3/2019 | Steiner | F04D 27/001 |
| 2019/0264700 | A1 * | 8/2019 | Huggins | F04D 27/002 |
| 2020/0202688 | A1 * | 6/2020 | Tian | G02B 3/08 |
| 2024/0125910 | A1 * | 4/2024 | Steiner | F24F 7/007 |

* cited by examiner

*Primary Examiner* — Kam Wan Ma
(74) *Attorney, Agent, or Firm* — Sinorica International

(57) ABSTRACT

A ceiling fan infrared detection and control system has a wall-mounted controller, a ceiling fan controller, and a motor. The wall-mounted controller has an infrared sensor that is arranged outwardly and horizontally. The wall-mounted controller is pivotally equipped with a lens outside the infrared sensor for detecting infrared rays of a human body within a detection range. The control unit can output a wireless signal to the ceiling fan controller to control the motor according to the infrared detection result. The ceiling fan infrared detection and control system uses the technical feature that the lens is rotatable relative to the wall-mounted controller, so that the detection range can be moved synchronously along with the lens. The detection range has directivity and the function of adjusting the detection position, which can avoid false detection of a pet below the height of the detection range.

9 Claims, 7 Drawing Sheets

CEILING FAN INFRARED DETECTION AND CONTROL SYSTEM

FIELD OF THE INVENTION

The present invention relates to a ceiling fan, and more particularly to a ceiling fan infrared detection and control system.

BACKGROUND OF THE INVENTION

In general, a conventional ceiling fan has a ceiling fan body. An infrared sensor is provided on the top of the ceiling fan body. The infrared sensor has a detection portion. The detection portion is arranged downward to detect infrared rays. In these days, many people keep pets, living in the same space. The infrared sensor can detect a human body and a pet, so the infrared sensor may detect a pet by mistake.

Accordingly, the inventor of the present invention has devoted himself based on his many years of practical experiences to solve these problems.

SUMMARY OF THE INVENTION

The primary object of the present invention is to provide a ceiling fan infrared detection and control system, which has the function of adjusting the detection position, direction and height, so as to avoid false detection of pets below the height of the detection range and increase the convenience of use.

In order to achieve the above object, the present invention provides a ceiling fan infrared detection and control system, applied to a ceiling fan. The ceiling fan has a motor. The ceiling fan is electrically connected to a power source. The ceiling fan infrared detection and control system comprises a wall-mounted controller and a ceiling fan controller. The wall-mounted controller is fixed on a wall. The wall-mounted controller includes an infrared sensor, a control unit, a power supply, and a wireless transmitter. The infrared sensor, the power supply and the wireless transmitter are electrically connected to the control unit, respectively. The power supply is electrically connected to the power source. The infrared sensor has a detection portion. The detection portion of the infrared sensor is arranged outwardly and horizontally for detecting infrared rays. A lens is pivotally connected to the wall-mounted controller. The lens is rotatable relative to the wall-mounted controller. The lens is spaced apart from the detection portion of the infrared sensor. The lens has a plurality of light guide structures. The light guide structures are fixed on one side of the lens, adjacent to the detection portion of the infrared sensor. The light guide structures each have one side corresponding to the detection portion of the infrared sensor and another side corresponding to a detection range so that the light guide structures and the detection range are moved synchronously along with the lens. When a human body passes through the detection range, the lens and the light guide structures receive the infrared rays in the detection range and transmit them to the infrared sensor. The infrared sensor detects the infrared rays produced by the human body to generate an infrared detection result and output a signal to the control unit. The control unit controls the wireless transmitter to output a wall-mounted controller wireless signal according to the signal output by the infrared sensor. The ceiling fan controller is disposed on the ceiling fan. The ceiling fan controller includes a driver, a control module, a power supply module, and a wireless receiving module. The driver, the power supply module and the wireless receiving module are electrically connected to the control module, respectively. The power supply module is electrically connected to the power source and the driver. The driver is electrically connected to the motor. The wireless receiving module receives the wall-mounted controller wireless signal of the wireless transmitter to output a signal to the control module. The control module outputs a first motor control signal to the driver to control the motor to start, stop or change a speed. The first motor control signal is related to the infrared detection result.

The ceiling fan infrared detection and control system provided by the present invention uses the technical feature that the lens is rotatable relative to the wall-mounted controller, so that the detection range can be moved synchronously along with the lens. The detection range has directivity and the function of adjusting the detection position, direction and height, which can avoid false detection of a pet below the height of the detection range.

DETAILED DESCRIPTION OF THE PREFERRED EMBODIMENTS

Figure 1:
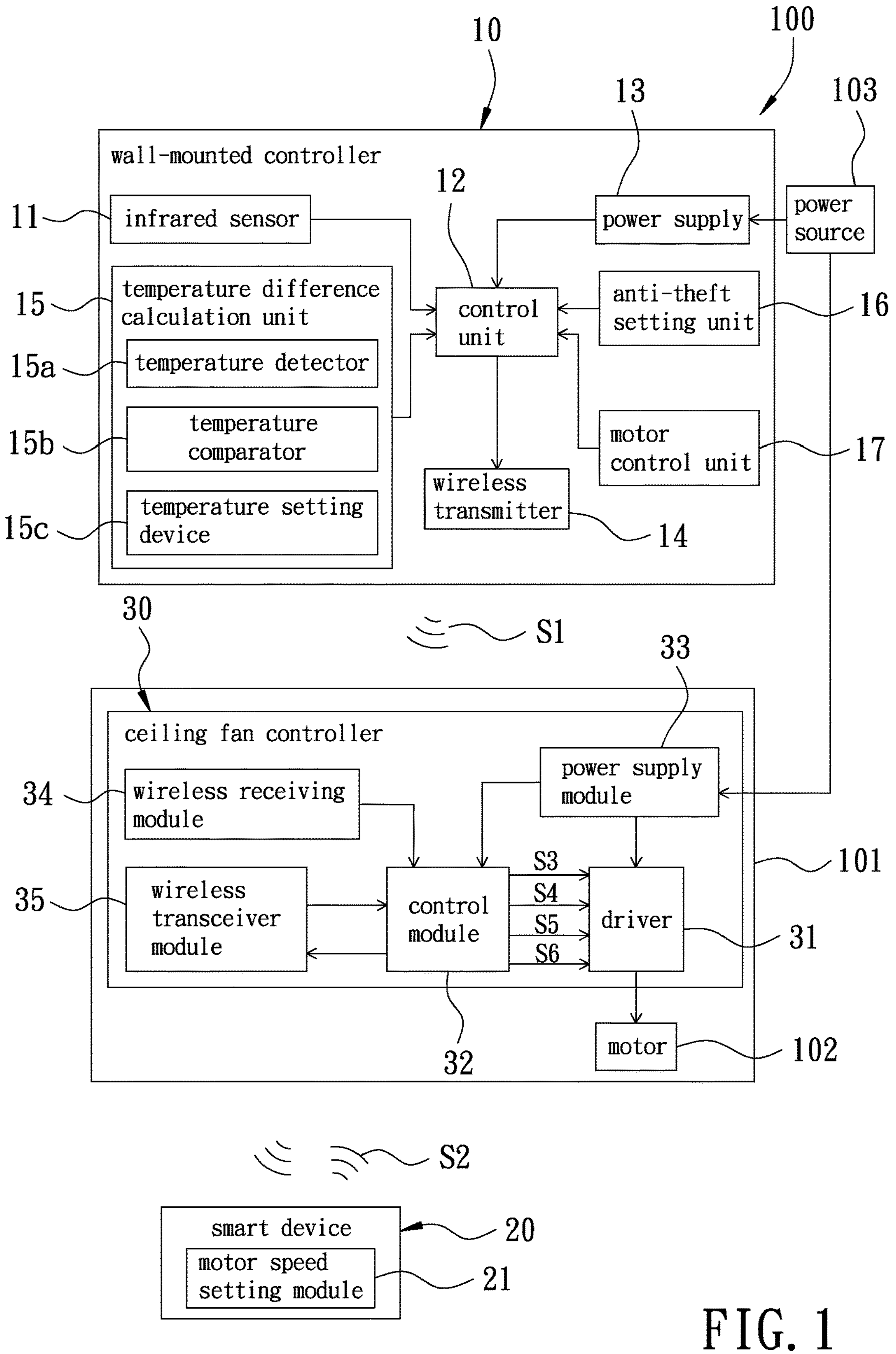
FIG. 1 is a block diagram of a preferred embodiment of the present invention.
Figure 2:
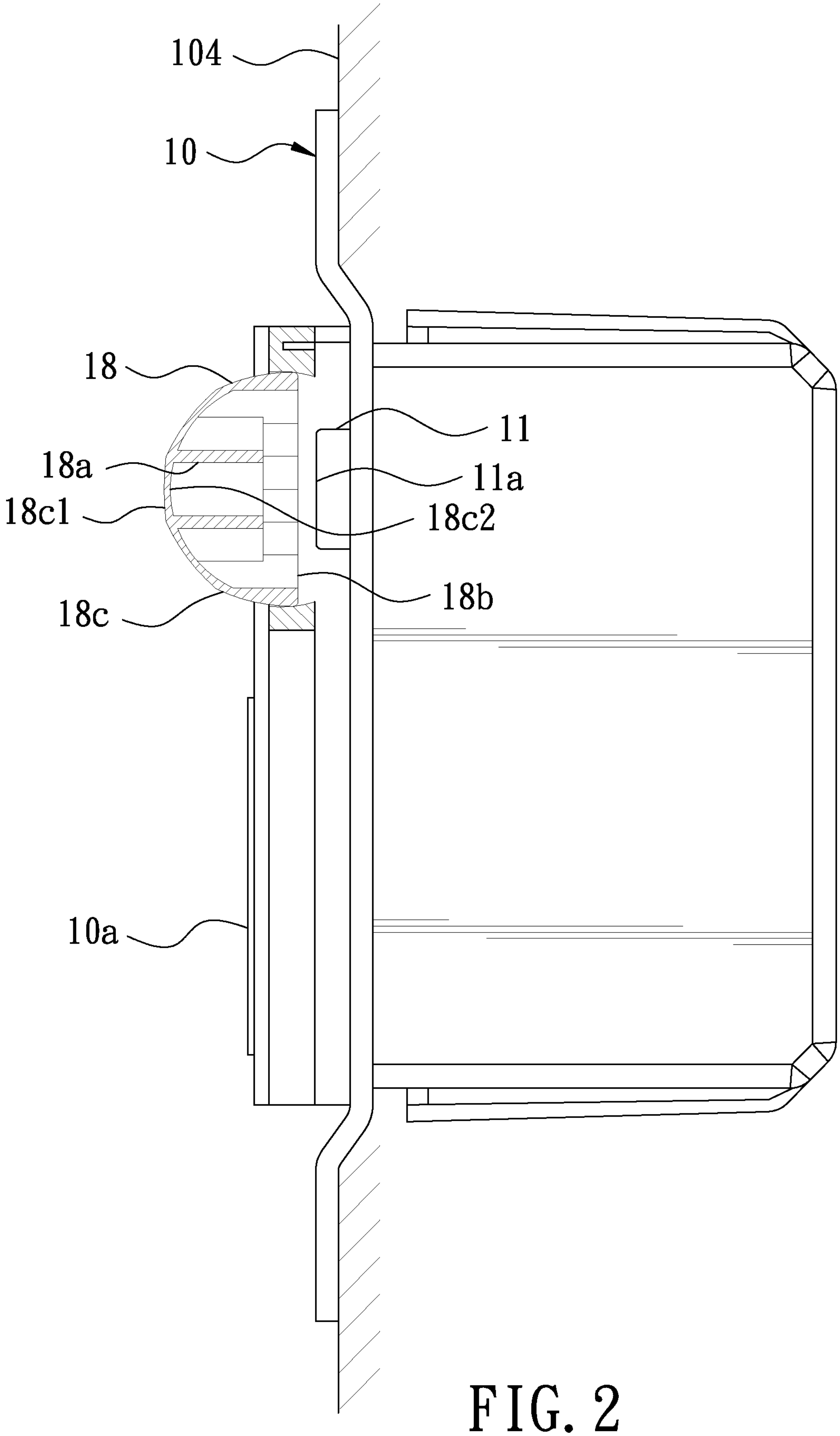
FIG. 2 is a cross-sectional view of the wall-mounted controller of the preferred embodiment of the present invention.
Figure 3:
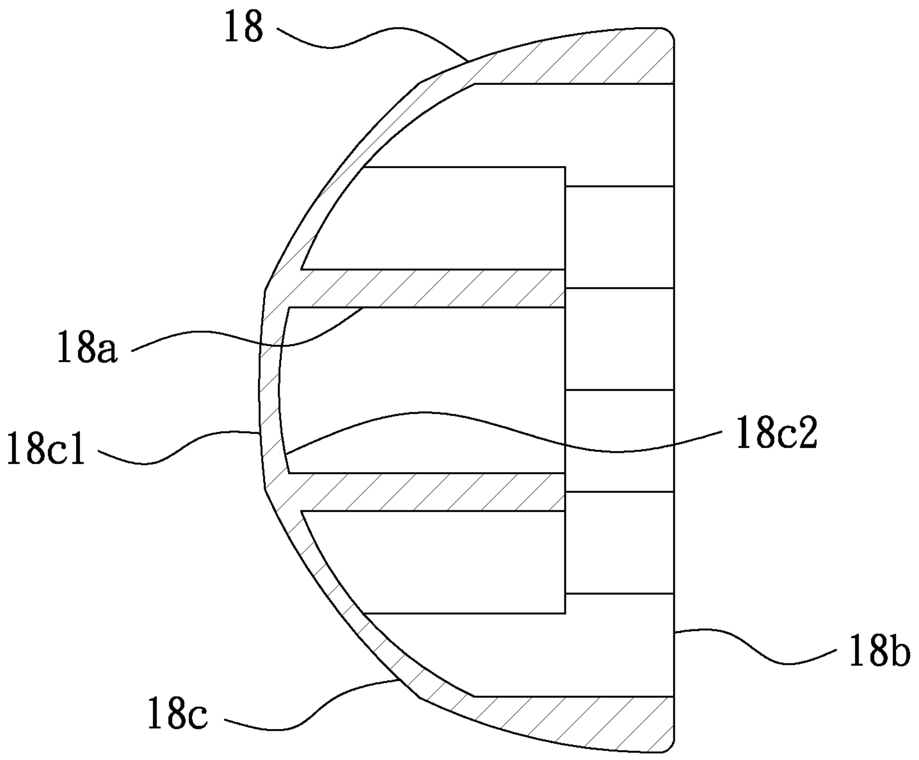
FIG. 3 is a cross-sectional view of the lens of the preferred embodiment of the present invention.
Figure 4:
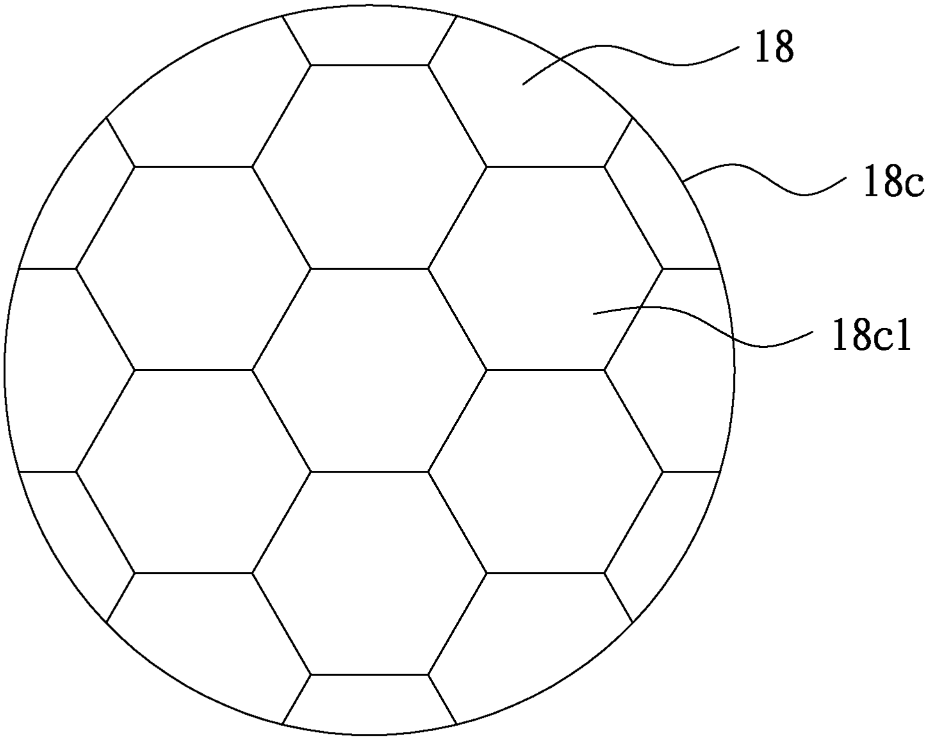
FIG. 4 is a front view of the lens of the preferred embodiment of the present invention.
Figure 5:
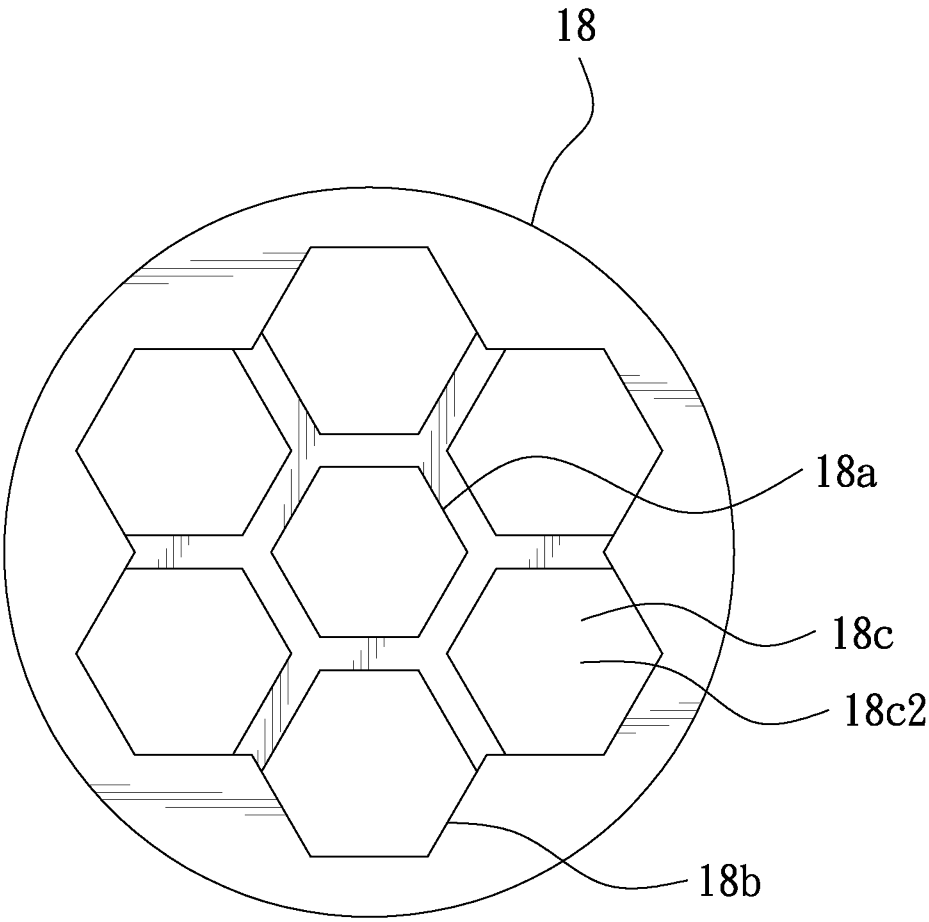
FIG. 5 is a rear view of the lens of the preferred embodiment of the present invention.

Embodiments of the present invention will now be described, by way of example only, with reference to the accompanying drawings.

FIGS. 1-7 illustrate a preferred embodiment of the present invention. The present invention discloses a ceiling fan infrared detection and control system 100, applied to a ceiling fan 101. The ceiling fan 101 has a motor 102. The ceiling fan 101 is electrically connected to a power source 103. The ceiling fan infrared detection and control system 100 comprises a wall-mounted controller 10 is fixed on a wall 104, a smart device 20, and a ceiling fan controller 30.

The wall-mounted controller 10 is fixed on a wall 104. The wall-mounted controller 10 includes an infrared sensor 11, a control unit 12, a power supply 13, a wireless transmitter 14, a temperature difference calculation unit 15, an anti-theft setting unit 16, and a motor control unit 17. The infrared sensor 11, the power supply 13, the wireless transmitter 14, the temperature difference calculation unit 15, the anti-theft setting unit 16 and the motor control unit 17 are electrically connected to the control unit 12, respectively. The power supply 13 is electrically connected to the power source 103. The infrared sensor 11 has a detection portion 11*a*. The detection portion 11*a* of the infrared sensor 11 is arranged outwardly and horizontally for detecting infrared rays. A lens 18 is pivotally connected to the shell of the wall-mounted controller 10. The lens 18 is rotatable relative to the wall-mounted controller 10. The lens 18 is spaced apart from the detection portion 11*a* of the infrared sensor 11. The lens 18 has a plurality of light guide structures 18*a*. The light guide structures 18*a* are fixed on one side of the lens 18, adjacent to the detection portion 11*a* of the infrared sensor 11. The light guide structures 18*a* each have one side corresponding to the detection portion 11*a* of the infrared sensor 11 and another side corresponding to a detection range 19, so that the light guide structures 18*a* and the detection range 19 can move synchronously along with the lens 18. The lens 18 is approximately hemispherical. One side of the lens 18 has an opening 18*b*. The opening 18*b* is adjacent to the infrared sensor 11. The other side of the lens 18 is formed with a lens wall 18*c*. One side of the lens wall 18*c*, away from the infrared sensor 11, has an outer wall surface 18*cl* of an approximately convex arc surface. The outer wall surface 18*cl* of the lens 18 is formed with a pattern corresponding to the light guide structures 18*a*. One side of the lens wall 18*c*, adjacent to the infrared sensor 11, has an inner wall surface 18*c*2 of an approximate concave arc surface. The light guide structures 18*a* are formed by hexagonal hollow structures extending axially, respectively. When a human body passes through the detection range 19, the lens 18 and the light guide structures 18*a* receive the infrared rays in the detection range 19 and transmit them to the infrared sensor 11, and the infrared sensor 11 detects the infrared rays produced by the human body to generate an infrared detection result and output a signal to the control unit 12, and the control unit 12 controls the wireless transmitter 14 to output a wall-mounted controller wireless signal S1 according to the signal output by the infrared sensor 11. The wall-mounted controller wireless signal S1 is an RF (radio frequency) wireless signal. The temperature difference calculation unit 15 includes a temperature detector 15*a*, a temperature comparator 15*b*, and a temperature setting device 15*c*. The temperature setting device 15*c* is configured for a user to set a temperature setting value. The temperature detector 15*a* is configured to detect an ambient temperature to generate an ambient temperature value. The temperature comparator 15*b* compares the ambient temperature value and the temperature setting value to generate a temperature difference value. The temperature difference calculation unit 15 outputs a signal to the control unit 12 according to the temperature difference value. The control unit 12 controls the wireless transmitter 14 to output the wall-mounted controller wireless signal S1 according to the signal output by the temperature difference calculation unit 15. The anti-theft setting unit 16 is configured for the user to set an anti-theft mode setting to output a signal to the control unit 12. The control unit 12 controls the wireless transmitter 14 to output the wall-mounted controller wireless signal S1 according to the signal output by the infrared sensor 11 and the signal output by the anti-theft setting unit 16. The motor control unit 17 is configured for the user to set the speed of the motor to generate a wall-mounted controller motor speed setting to output a signal to the control unit 12. The control unit 12 controls the wireless transmitter 14 to output the wall-mounted controller wireless signal S1 according to the signal output by the motor control unit 17. The wall-mounted controller wireless signal S1 may be related to at least one of the infrared detection result, the temperature difference value, the anti-theft mode setting and the wall-mounted controller motor speed setting. The wall-mounted controller 10 further has an operation interface 10*a*. The operation interface 10*a* corresponds to the infrared sensor 11, the temperature setting device 15*c*, the anti-theft setting unit 16 and the motor control unit 17 for the user to operate and set the infrared sensor 11, the temperature setting device 15*c*, the anti-theft setting unit 16 and the motor control unit 17.

The smart device 20 is configured to receive and transmit a smart device wireless signal S2. The smart device wireless signal S2 may be a Bluetooth signal or a Wi-Fi signal. The smart device 20 has a motor speed setting module 21 for the user to set the speed of the motor to output a motor setting and transmit the smart device wireless signal S2. The smart device 20 may be a mobile device, a smart phone, a smart car, a smart thermostat, a smart doorbell, a smart refrigerator, a tablet computer, a smart watch, a smart key buckle or smart glasses, etc. The motor speed setting module 21 may be an application program, software (APP) and the like.

The ceiling fan controller 30 is disposed on the ceiling fan 101. The ceiling fan controller 30 includes a driver 31, a control module 32, a power supply module 33, a wireless receiving module 34, and a wireless transceiver module 35. The driver 31, the power supply module 33, the wireless receiving module 34 and the wireless transceiver module 35 are electrically connected to the control module 32, respectively. The power supply module 33 is electrically connected to the power source 103 and the driver 31. The driver 31 is electrically connected to the motor 102. The wireless receiving module 34 receives the wall-mounted controller wireless signal S1 of the wireless transmitter 14 to output a signal to the control module 32. The control module 32 outputs a first motor control signal S3 to the driver 31 to control the motor 102 to start, stop or change the speed according to the infrared detection result of the infrared sensor 11. The first motor control signal S3 is related to the infrared detection result. The control module 32 outputs a motor speed change signal S4 to the driver 31 to control the motor 102 to change the speed according to the temperature difference value of the temperature difference calculation unit 15. The motor speed change signal S4 is related to the temperature difference value. The control module 32 outputs a second motor control signal S5 to the driver 31 to control the motor 102 to start, stop or change the speed according to the wall-mounted controller motor speed setting of the motor control unit 17. The second motor control signal S5 is related to the wall-mounted controller motor speed setting. The wireless transceiver module 35 receives the smart device wireless signal S2 to output a signal to the control module 32. The control module 32 outputs a third motor control signal S6 to the driver 31 to control the motor 102 to start, stop or change the speed according to the motor setting of the motor speed setting module 21 of the smart device 20. The third motor control signal S6 is related to the motor setting. The control module 32 outputs a signal and an anti-theft detection result to the wireless transceiver module 35 according to the anti-theft mode setting and the infrared detection result, and transmits them to the smart device 20 through the wireless transceiver module 35 to notify the user.

Figure 6:
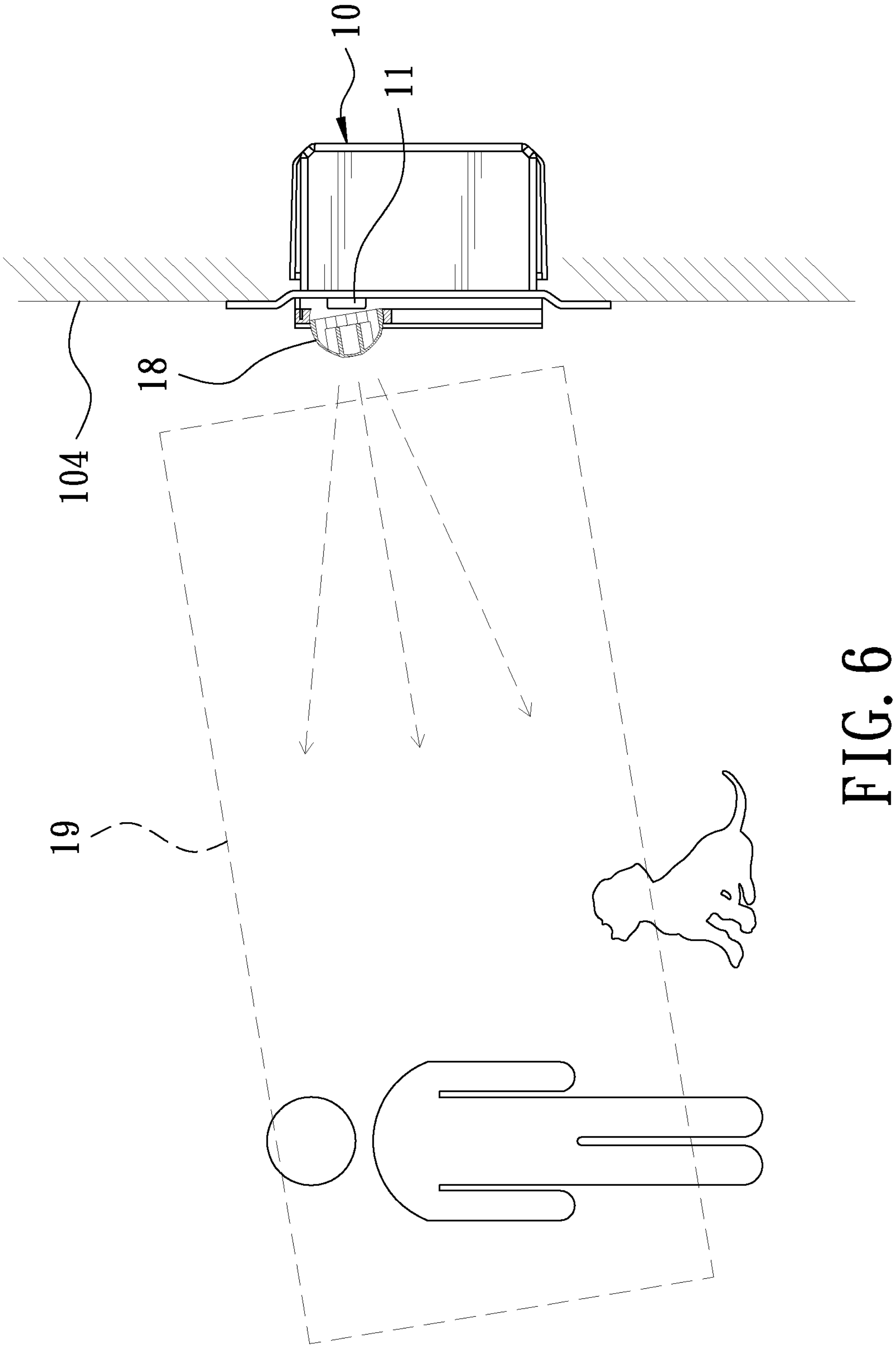
FIG. 6 is a schematic view of the preferred embodiment of the present invention when in use, illustrating the lens that is rotated to a downward position and the detection range.
Figure 7:
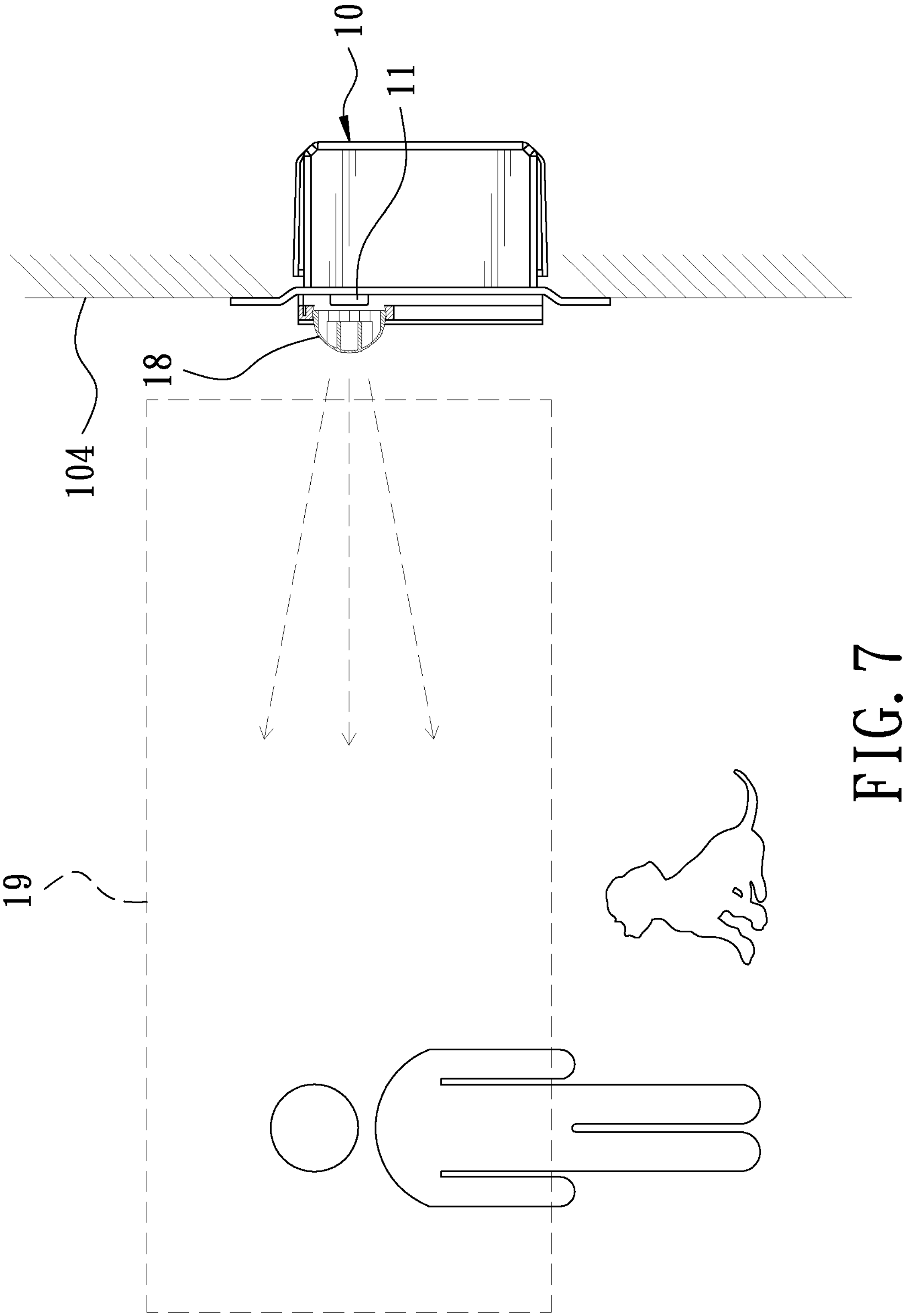
FIG. 7 is a schematic view of the preferred embodiment of the present invention when in use, illustrating the lens that is rotated to a horizontal position and the detection range.

When the user keeps a pet, the situation shown in FIG. 6 may occur. For example, when the anti-theft mode setting is set, the alarm may be triggered due to false detection of the pet. In order to avoid false detection of the pet, the user can touch the pattern of the outer wall surface 18*cl* of the lens 18. The frictional force of the pattern on the outer wall surface 18*cl* allows the user to rotate the lens 18 and adjust the position of the detection range 19. The detection range 19 can be moved synchronously along with the lens 18. The detection range 19 has directivity and the function of adjusting the detection position, direction and height, which can avoid false detection of the pet below the height of the detection range 19.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A ceiling fan infrared detection and control system, applied to a ceiling fan, the ceiling fan having a motor, the ceiling fan being electrically connected to a power source, the ceiling fan infrared detection and control system comprising:

a wall-mounted controller, fixed on a wall, the wall-mounted controller including an infrared sensor, a control unit, a power supply and a wireless transmitter, the infrared sensor, the power supply and the wireless transmitter being electrically connected to the control unit respectively, the power supply being electrically connected to the power source, the infrared sensor having a detection portion, the detection portion of the infrared sensor being arranged outwardly and horizontally for detecting infrared rays, a lens being pivotally connected to the wall-mounted controller, the lens being rotatable relative to the wall-mounted controller, the lens being spaced apart from the detection portion of the infrared sensor, the lens having a plurality of light guide structures, the light guide structures being fixed on one side of the lens, adjacent to the detection portion of the infrared sensor, the light guide structures each having one side corresponding to the detection portion of the infrared sensor and another side corresponding to a detection range so that the light guide structures and the detection range are moved synchronously along with the lens, the detection range having directivity and the function of adjusting a detection position, direction and height, wherein when a human body passes through the detection range, the lens and the light guide structures receive the infrared rays in the detection range and transmit them to the infrared sensor, and the infrared sensor detects the infrared rays produced by the human body to generate an infrared detection result and output a signal to the control unit, and the control unit controls the wireless transmitter to output a wall-mounted controller wireless signal according to the signal output by the infrared sensor;

a ceiling fan controller, disposed on the ceiling fan, the ceiling fan controller including a driver, a control module, a power supply module and a wireless receiving module, the driver, the power supply module and the wireless receiving module being electrically connected to the control module respectively, the power supply module being electrically connected to the power source and the driver, the driver being electrically connected to the motor, the wireless receiving module receiving the wall-mounted controller wireless signal of the wireless transmitter to output a signal to the control module, the control module outputting a first motor control signal to the driver to control the motor to start, stop or change a speed, the first motor control signal being related to the infrared detection result.

2. The ceiling fan infrared detection and control system as claimed in claim 1, wherein the wall-mounted controller further includes a temperature difference calculation unit, the temperature difference calculation unit is electrically connected to the control unit, the temperature difference calculation unit includes a temperature detector, a temperature comparator and a temperature setting device, the temperature setting device is configured for a user to set a temperature setting value, the temperature detector is configured to detect an ambient temperature to generate an ambient temperature value, the temperature comparator compares the ambient temperature value and the temperature setting value to generate a temperature difference value, the temperature difference calculation unit outputs a signal to the control unit according to the temperature difference value, the control unit controls the wireless transmitter to output the wall-mounted controller wireless signal according to the signal output by the temperature difference calculation unit, the control module outputs a motor speed change signal to the driver to control the motor to change the speed, and the motor speed change signal is related to the temperature difference value.

3. The ceiling fan infrared detection and control system as claimed in claim 2, wherein the wall-mounted controller further includes a motor control unit, the motor control unit is electrically connected to the control unit, the motor control unit is configured for the user to set the speed of the motor to generate a wall-mounted controller motor speed setting to output a signal to the control unit, the control unit controls the wireless transmitter to output the wall-mounted controller wireless signal according to the signal output by the motor control unit, the control module outputs a second motor control signal to the driver to control the motor to start, stop or change the speed, and the second motor control signal is related to the wall-mounted controller motor speed setting.

4. The ceiling fan infrared detection and control system as claimed in claim 3, further comprising a smart device configured to receive and transmit a smart device wireless signal, the smart device wireless signal being one of a Bluetooth signal and a Wi-Fi signal, the smart device having a motor speed setting module for the user to set the speed of the motor to output a motor setting and transmit the smart device wireless signal, the ceiling fan controller further including a wireless transceiver module, the wireless transceiver module being electrically connected to the control module, the wireless transceiver module being configured to receive the smart device wireless signal to output a signal to the control module, the control module outputting a third motor control signal to the driver to control the motor to start, stop or change the speed, the third motor control signal being related to the motor setting, the wall-mounted controller further including an anti-theft setting unit, the anti-theft setting unit being electrically connected to the control unit, the anti-theft setting unit being configured for the user to set an anti-theft mode setting to output a signal to the control unit, the control unit controlling the wireless transmitter to output the wall-mounted controller wireless signal according to the signal output by the infrared sensor and the signal output by the anti-theft setting unit, the control module outputting a signal and an anti-theft detection result to the wireless transceiver module according to the anti-theft mode setting and the infrared detection result and transmitting them to the smart device through the wireless transceiver module.

5. The ceiling fan infrared detection and control system as claimed in claim 4, wherein one side of the lens has an opening, the opening is adjacent to the infrared sensor, another side of the lens is formed with a lens wall, one side of the lens wall, away from the infrared sensor, has an outer wall surface of a convex surface, and another side of the lens wall, adjacent to the infrared sensor, has an inner wall surface of a concave surface.

6. The ceiling fan infrared detection and control system as claimed in claim 5, wherein the light guide structures are formed by hexagonal hollow structures extending axially, respectively.

7. The ceiling fan infrared detection and control system as claimed in claim 6, wherein the outer wall surface of the lens is formed with a pattern corresponding to the light guide structures.

8. The ceiling fan infrared detection and control system as claimed in claim 4, wherein the wall-mounted controller further has an operation interface, the operation interface corresponds to the infrared sensor, the temperature setting device, the anti-theft setting unit and the motor control unit for the user to operate and set the infrared sensor, the temperature setting device, the anti-theft setting unit and the motor control unit, and the wall-mounted controller wireless signal is an RF (radio frequency) wireless signal.

9. The ceiling fan infrared detection and control system as claimed in claim 4, wherein the wall-mounted controller wireless signal is an RF (radio frequency) wireless signal.

* * * * *